(12) United States Patent
Kawasaki et al.

(10) Patent No.: US 6,554,711 B1
(45) Date of Patent: Apr. 29, 2003

(54) MUSIC GAME MACHINE WITH INTERACTIVE SECOND GAME DEVICE

(75) Inventors: Yasushi Kawasaki, Yokohama (JP); Sadaharu Katori, Yokohama (JP)

(73) Assignee: Konami Co., Ltd., Tokyo (JP)

( * ) Notice: Subject to any disclaimer, the term of this patent is extended or adjusted under 35 U.S.C. 154(b) by 521 days.

(21) Appl. No.: 09/604,229

(22) Filed: Jun. 27, 2000

(30) Foreign Application Priority Data

Jun. 30, 1999 (JP) ............................................. 11-186695

(51) Int. Cl.⁷ ................................................ A63F 13/00
(52) U.S. Cl. ............................................. 463/43; 463/7
(58) Field of Search ............................... 413/7, 23, 43; 434/307 A

(56) References Cited

U.S. PATENT DOCUMENTS 5,489,103 A * 2/1996 Okamoto ...................... 463/29
5,649,862 A * 7/1997 Sakaguchi et al. ............ 463/44
6,314,483 B1 * 11/2001 Goto et al. ................. 710/107
6,392,613 B1 * 5/2002 Goto ............................. 345/30

FOREIGN PATENT DOCUMENTS

WO          WO9848377          10/1998

OTHER PUBLICATIONS

"PocketStation FAQ v1.3", 'Online!', Oct. 27, 1998, pp. 1–4.
"Beat Mania Beats a Path Home", 'Online!', Oct. 6, 1998, p. 1.
"Beatmania Lands on WonderSwan", 'Online!', Jan. 8, 1999, p. 1.

\* cited by examiner

*Primary Examiner*—John M Hotaling, II
(74) *Attorney, Agent, or Firm*—Jordon and Hamburg LLP

(57) ABSTRACT

In a musical game system, there is a corresponding relationship between a game executed in a main body game device and a game executed in a portable game device functioning as an auxiliary memory apparatus of the main body game device. Data for music reproduction for reproducing a plurality of tunes and timing data specifying a series of manipulations of input apparatus provided in correspondence with the plurality of tunes are stored in memory apparatus of first and second game devices. In the games of each game device, a tune is selected from the plurality of tunes, a series of manipulations of the input apparatus based on the timing data corresponding to the selected tune is displayed to the player, and the selected tune is reproduced based on the data for music reproduction corresponding to the selected tune. Information corresponding to the progression of the game executed in the first game device is stored in the memory apparatus of the second game device, and the range of the selectable tunes in the second game device is set based on the information stored in the memory apparatus.

10 Claims, 13 Drawing Sheets

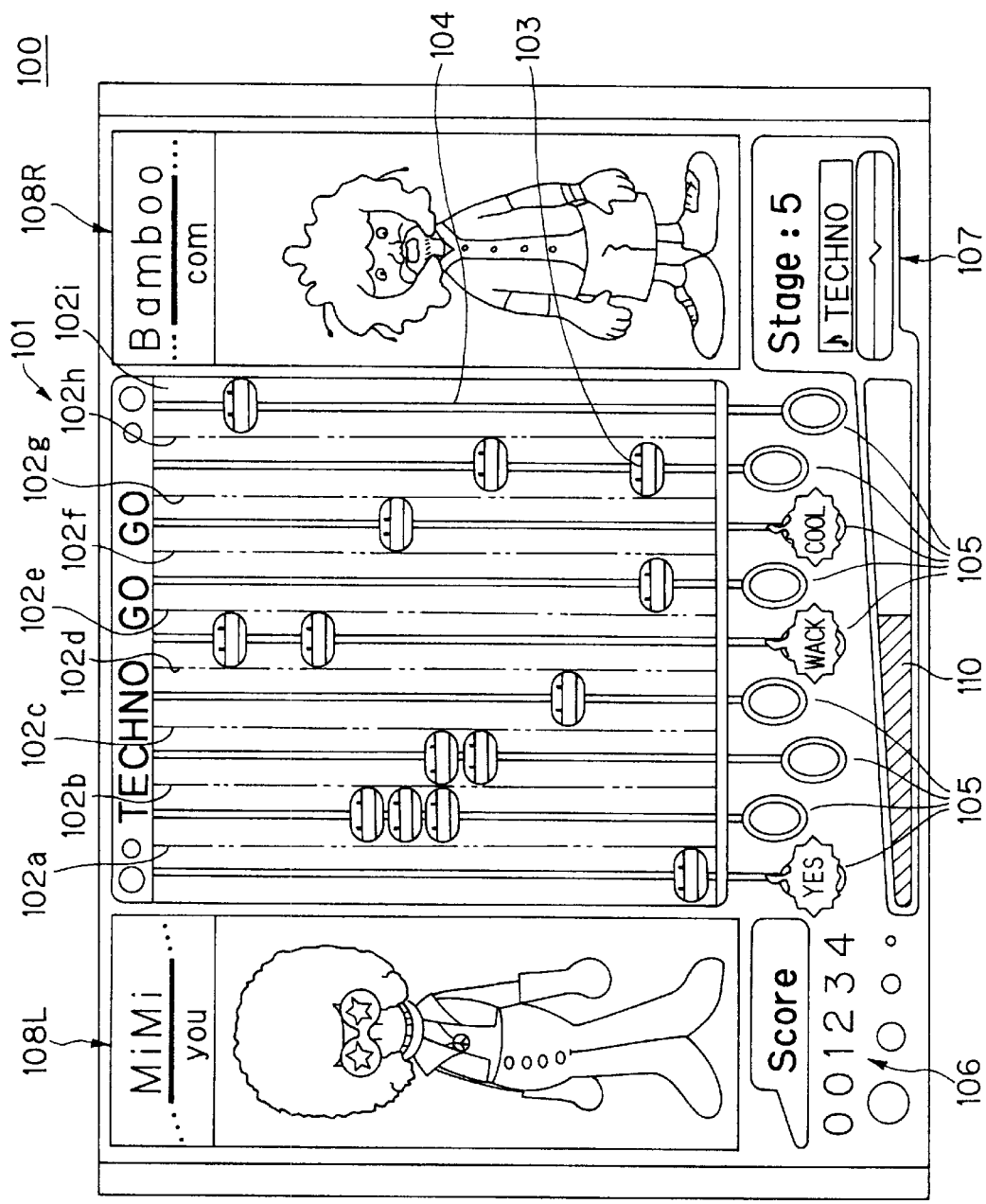

TUNE X DATA

PERFORMANCE DATA

FIG.11

NONVOLATILE MEMORY

USER DATA FILE

PLAY HISTORY INFORMATION

MUSIC GAME MACHINE WITH INTERACTIVE SECOND GAME DEVICE

BACKGROUND OF THE INVENTION

1. Field of the Invention

The present invention relates to a game system which is manipulated as entertainment in time to music.

2. Description of the Related Art

A game system manipulated as entertainment in time to music was for example disclosed in Japanese Patent Application Laid-Open (TOKU-KAI-HEI) No. 11-151380. In this type of game system, a sequence for manipulating manipulation members (such as push-buttons) of an input apparatus are specified to a player on the game screen of a monitor in time with music which is reproduced as background music (BGM). When the player manipulates the input apparatus in accordance with the specified commands, sound effects corresponding to the manipulations are superimposed over the BGM. In addition, the player is evaluated based on the degree of match between the specified manipulation sequence and the actual manipulations carried out by the player.

Japanese Patent Application Laid-Open (TOKU-KAI-HET) No. 11-7504 disclosed a game system in which a CPU and a liquid crystal display apparatus and the like are provided in an auxiliary memory apparatus for storing data of a game system for home use, it being possible to use the auxiliary memory apparatus itself as a portable game device. This type of game system makes it possible to enjoy the game in a way not possible on a single game device, by providing some sort of connection between the game played on the main body of the game device and the game played on the portable game device provided as an auxiliary memory apparatus.

SUMMARY OF THE INVENTION

Accordingly, it is an object of this invention to increase the novelty of a musical game system by providing a connection between the game played on the main body of the game device and the game played on the game device functioning as an auxiliary memory apparatus.

A first aspect of this invention provides a game system comprising first and second game devices, the second game device comprising memory device for save which allows the second game device to function as an auxiliary memory apparatus of the first game device, each of the first and second game devices comprising an input apparatus having a plurality of manipulation members which outputs a signal in accordance with manipulation of the manipulation members; memory device for game in which there are stored for each tune data for music reproduction for reproducing a plurality of tunes and timing data stipulating a series of manipulations of the input apparatus in correspondence with the plurality of tunes being stored in the memory device; tune selecting device which selects one tune from the plurality of tunes; manipulation guide device which specifies a series of manipulations of the input apparatus corresponding to the selected tune to a player based on timing data corresponding to the selected tune; music reproducing device which reproduces the selected tune based on data for music reproduction corresponding to the selected tune; the first game device comprising record executing device which stores information corresponding to the progression of the game executed in the first game device in the memory device for save of the second game device by using data stored in the memory device for game; and the second game device comprising selection range setting device which sets a range of selectable tunes in the tune selecting device of the second game device based on the information corresponding to the progression of the game stored in the memory device for save.

According to this aspect, a tune can be selected from a plurality of tunes and a series of manipulations corresponding to the tune can be specified to the player by the manipulation guide device in the first game device and the second game device. When the player manipulates the input apparatus in compliance with the specification from the manipulation guide device, a tune corresponding to the selected tune is reproduced, giving the player a sensation of manipulating the input apparatus in time with the music and enabling him or her to experience the pleasure of performing or directing music. The range of selectable tunes in the second game device changes in accordance with the progression of the game in the first game device. Therefore, one of the pleasures of playing the game on the first game device is that the selectable tunes in the second game device change, thereby adding an element which cannot be realized by using a single game device. Consequently, the novelty of the game system is increased and the player's interest can be sufficiently maintained. The progression of the first game device can be represented by the number of completed plays, the number of tunes in which the game result has exceeded a predetermined result, etc. The game result can for example be evaluated according to the degree of match between the series of manipulations stipulated in the timing data and the actual manipulations of the input apparatus which are carried out by the player. The degree of match can for example be evaluated according to the size of temporal deviation between the timings of the series of manipulations stipulated in the timing data and the manipulations which are actually carried out. The music reproduction device may continuously reproduce the main melody of the tune irrespective of whether the input apparatus is manipulated, or may reproduce the main melody when the input apparatus has been correctly manipulated in the manner specified by the manipulation guide device.

A second aspect of this invention comprises the game system described in the first aspect, wherein the first game device comprises selection range setting device which sets a range of selectable tunes in the tune selecting device of the first game device based on the progression of the game in the first game device.

According to this aspect, the range of selectable tunes in the first game device and the second game device changes in accordance with the progression of the game in the first game device. Therefore, the player's enthusiasm for progressing in the first game device, and consequently his or her interest in the game system, can be increased by enlarging the range of selectable tunes in both games as the progression of the game executed in the first game device increases.

A third aspect of this invention comprises the game system described in the second aspect, wherein the selection range setting device of the first game device enlarges the range of selectable tunes in the first game device in compliance with progression of the game, and the selection range setting device of the second game device enlarges the range of selectable tunes in the tune selecting device of the second game device in compliance with an increasing progression which is identified from the information provided in correspondence with the progression of the game stored in the memory device for save.

According to this aspect, the player's enthusiasm for progressing in the first game device, and consequently his or her interest in the game system, can be increased as mentioned in the example of the second aspect.

A fourth aspect of this invention comprises the game system according to the first or second aspect, wherein the record executing device of the first game device stores information for determining whether each of the plurality of tunes has been selected in the game executed in the first game device as information provided in correspondence with the progression in the memory device for save; and the selection range setting device of the second game device sets the range of selectable tunes based on the information provided in correspondence with the progression stored in the memory device for save, so that tunes corresponding to the tunes which were selected in the game executed in the first game device are made selectable in the second game device.

According to this aspect, by setting the number of selectable tunes in the first game device to increase as the progression in the game increases, the number of selectable tunes in the second game device also increases in accordance with the progression. Moreover, when a tune which has newly been made selectable is played in the first game device, a tune corresponding to that tune becomes selectable in the second game device, thereby making it possible to increase the player's interest by tailoring the correspondence therebetween. For example, using a constitution wherein when one tune is selected on the first game device, the same tune can be played on the second game device, the player's interest is at first concentrated on increasing his or her progression in the game executed on the first game device. As the player progresses through the game, tunes are then made newly selectable in the second game device. Thereafter, the player once again tries to increase his or her progression in the first game device. In this way, the player's interest in both game devices can be maintained, and the second game device functions not only as an auxiliary memory apparatus of the first game device but also as effective device for providing a device of entertainment which cannot be realized by using a single game device.

A fifth aspect of this invention comprises the game system according to the first or second aspect, wherein the plurality of tunes prepared for the second game device matchs at least some of the plurality of tunes prepared for the first game device; the record executing device of the first game device stores information for determining whether each of the plurality of tunes has been selected in the game executed in the first game device as information provided in correspondence with the progression in the memory device for save; and the selection range setting device of the second game device sets the range of selectable tunes based on the information provided in correspondence with the progression stored in the memory device for save, so that tunes matching tunes which have been selected in the game executed in the first game device are made selectable in the second game device, and tunes matching unselected tunes become nonselectable.

According to this aspect, when the number of selectable tunes in the first game device is set so as to increase as the progression in the game increases, the number of selectable tunes in the second game device also increases in accordance with the progression as mentioned in the explanation of the fourth aspect. When a tune which has newly been made selectable is played in the first game device, a tune identical to that tune becomes selectable in the second game device, thereby making it possible to maintain the player's interest in both game devices by enabling the player to play the same tune in the second game device as one selected in the first game device. Furthermore, the second game device functions not only as an auxiliary memory apparatus of the first game device but also as effective device for providing a device of entertainment which cannot be realized by using a single game device. Identical tunes need only have the same main melodic progression; Difference in accompaniments and arrangements of the tune makes nothing against the identity.

A sixth aspect of this invention comprises the game system according to the fifth aspect, wherein the second game device comprises information display device which displays information representing the number of tunes which have been selected in the game executed in the first game device on a screen of a display device provided in the second game device based on the information provided in correspondence with the progression stored in the memory device for save.

According to this aspect, the player can easily confirm the number of tunes that have been selected so far by the second game device.

A seventh aspect of this invention comprises the game system according to the first aspect, wherein the data for each music reproduction in the memory device for game of the first and second game devices includes data for generating sound effects which generates predetermined sound effect in compliance with a series of manipulations stipulated in the timing data; and when the player has manipulated the input apparatus in compliance with the series of manipulations specified by the manipulation guide device, the music reproducing devices of the first and second game devices generate sound effects based on the data for generating sound effects in correspondence with each manipulation.

According to this aspect, when the player manipulates the input apparatus in compliance with the specifications of the manipulation guide device, sound effects corresponding to the manipulation are generated. Consequently, the player has a stronger impression of performing the music and superimposing the sound effects over the predetermined music.

An eighth aspect of this invention comprises the game system according to the seventh aspect, wherein the data for generating sound effects stored in the memory device for game of the second game device is configured so that, when the player has correctly manipulated the input apparatus in correspondence with the series of manipulations specified by the manipulation guide device of the second game device, a main melody of the selected tune is reproduced from the music reproducing device.

According to this aspect, the second game device is prepared as an auxiliary memory apparatus of the first game device, and reliably reproduces the main melody even when its capability as a game device is lower than that of the first game device, thereby giving the player a reliable impression of playing with music.

A ninth aspect of this invention comprises the game system according to one of the first to eighth aspects, wherein the second game device comprises a built-in power battery, and is constituted as a portable game device which can be operated by power supplied from the power battery. According to this aspect, the player can carry the second game device any place separating from the first game device, thereby enabling the player to enjoy playing the game even where a power supply is not available. Consequently, the pleasure of the game system can be further increased.

A tenth aspect of this invention provides a computer-readable memory medium which can be used in a game system comprising first and second game devices, the second game device comprising memory device for save which allows the second game device to function as an auxiliary memory apparatus of the first game device, the memory medium storing a program for game for executing predetermined games provided in correspondence with music in the first and second game devices by using computers of the first and second game devices, and a data group for game which is needed to execute the program for game; the data group for game comprising (a) data for music reproduction for reproducing a plurality of tunes and (b) timing data for each tune stipulating a series of manipulations of the input apparatus in correspondence with each of the plurality of tunes; the program for game allowing the computers of the first and second game devices to function as tune selecting device which selects one tune from the plurality of tunes; manipulation guide device which specifies a series of manipulation of the input apparatus corresponding to the selected tune to a player based on timing data corresponding to the selected tune; music reproducing device which reproduces the selected tune based on data for music reproduction corresponding to the selected tune; and allowing the computer of the first game device to function as record executing device which stores information corresponding to the progression of the game executed in the first game device in the memory device for save of the second game device, and allowing the computer of the second game device to function as selection range setting device which sets a range of selectable tunes when the computer of the second game device functions as a tune selecting device based on the information corresponding to the progression of the game stored in the memory device for save.

According to this aspect, computers of the game devices read programs and data groups stored in the memory medium and execute the programs, thereby forming the game system of the first aspect.

BRIEF DESCRIPTION OF THE DRAWINGS

FIG. 5 is a diagram showing one example of a game screen displayed in a main game executed in compliance with the program for main game of FIG. 4.

FIG. 7 is a diagram showing one part of the timing data of FIG. 6B as a time-chart like.

FIG. 11 is a diagram showing data written in a nonvolatile memory of the portable game device of FIG. 3.

DESCRIPTION OF THE PREFERRED EMBODIMENT

Figure 1:
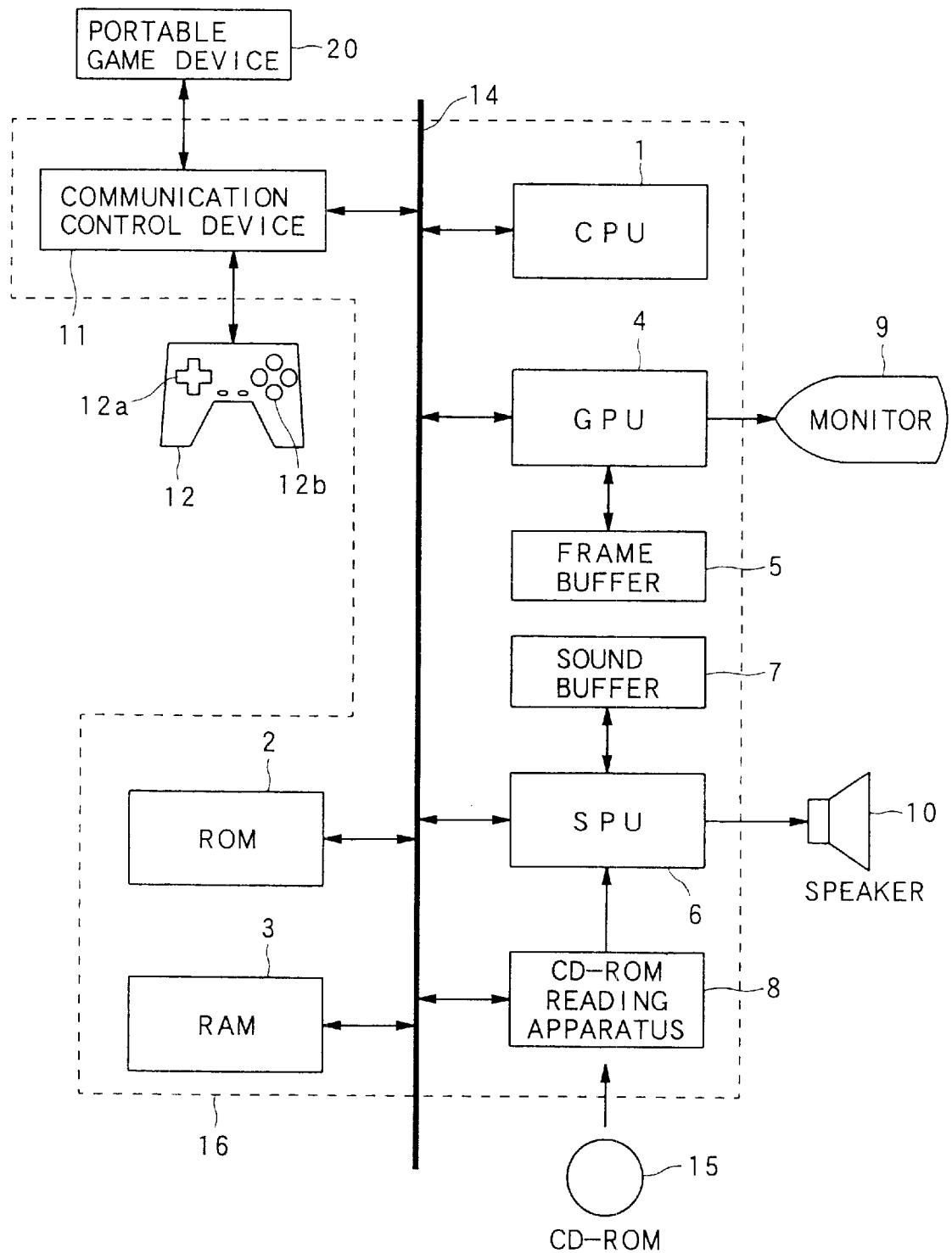
FIG. 1 is a block diagram of a game system according to an embodiment of the present invention.

FIG. 1 is a block diagram showing a control system of a game system for home use in which the present invention has been applied. The game system for home use executes a predetermined game in compliance with a game program stored in a CD-ROM 15 which constitutes a recording medium.

This game system comprises a CPU 1 mainly comprising a microprocessor; a ROM 2 and a RAM 3 which function as main memory apparatuses for the CPU 1; a graphics processing unit (GPU) 4 and a sound processing unit (SPU) 6 for image processing and audio processing respectively; buffers 5 and 7 for these units; and a CD-ROM reading apparatus 8. An operating system comprising a program needed for controlling the operations of the entire game apparatus is written in the ROM 2. Programs and data for the game which have been read from the CD-ROM 15 constituting a recording medium are written in the RAM 3 as required. The GPU 4 receives image data from the CPU 1 and paints a game screen on the buffer 5. In addition, the GPU 4 converts the data of the painted image to a predetermined video reproduction signal and outputs it at a predetermined timing to a monitor 9. The SPU 6 reproduces data such as music, notes, sound source data and the like, which have been read from the CD-ROM 15 and recorded in the sound buffer 7, and outputs them from a speaker 10. In compliance with instructions from the CPU 1, the CD-ROM read apparatus 8 reads the programs and data stored in the CD-ROM 15 and outputs a signal corresponding to the contents thereof. Programs and data needed for executing the game are stored in the CD-ROM 15, and will be explained later. Generally, a television set for home use is used as the monitor 9 and a built-in speaker of the television set is used as the speaker 10.

Moreover, a communications control device 11 is connected to the CPU 1 via a bus 14. A controller 12 and a portable game device 20 are connected to the communications control device 11 and each can be freely installed and removed. The controller 12 functions as an input apparatus, and has manipulation members which are manipulated by the player. For example, switches 12a and push-button switches 12b . . . for inputting in the up, down, left and right directions are provided in a cross-shaped arrangement as the manipulation members. The communication control device 11 scans the manipulation status of the manipulation members 12a and 12b of the controller 12 in a fixed cycle (e.g. one-sixtieth of a second) and outputs a signal corresponding to the result of the scan to the CPU 1. The CPU 1 determines the manipulation status of the controller 12 based on this signal. Various constitutions can be used for the controller 12.

In the constitution described above, the constituent elements other than the monitor 9, the speaker 10, the controller 12, the CD-ROM 15 and the portable game device 20, form a game device main body 16 which is solidly contained in a predetermined housing.

Figure 2:
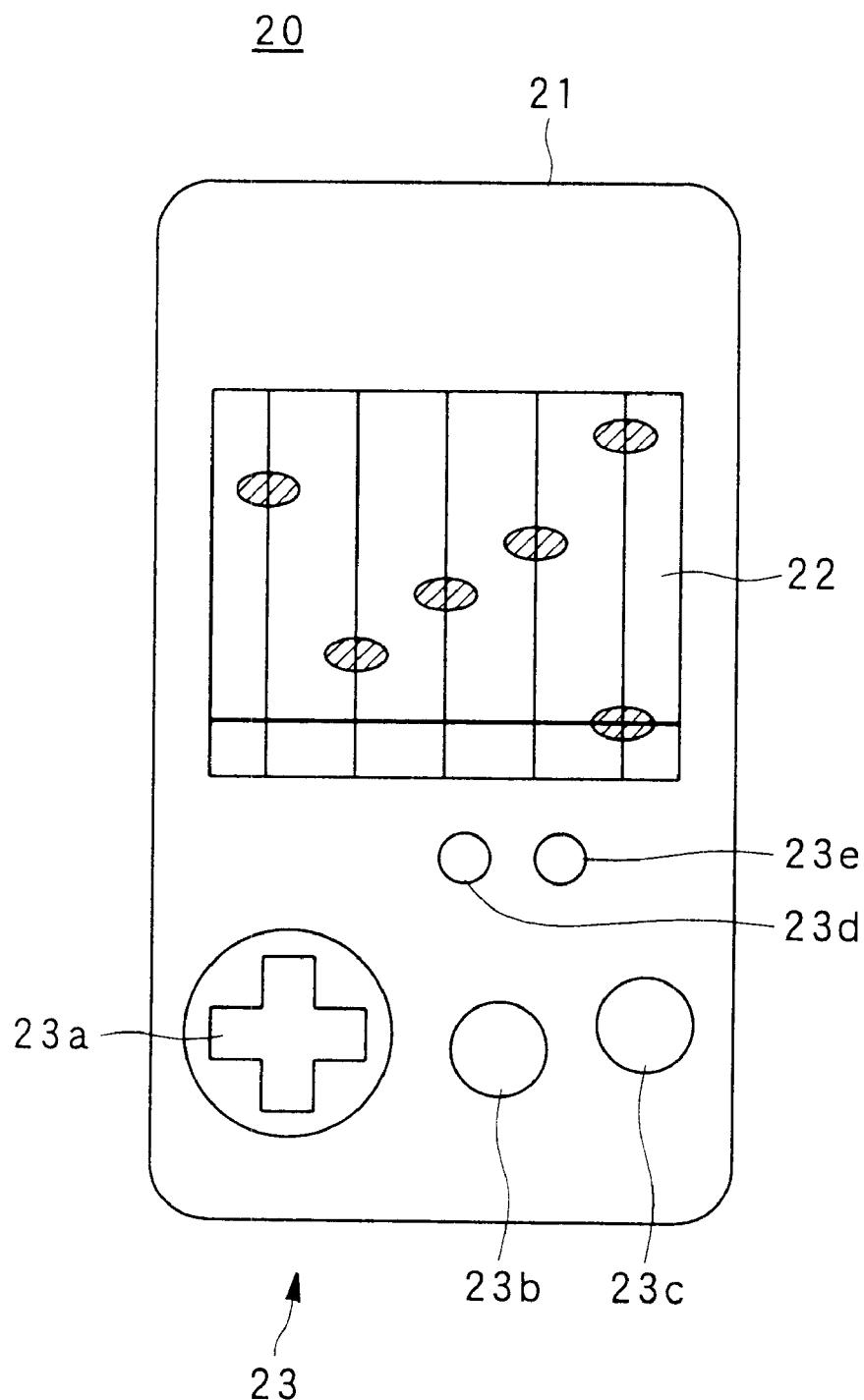
FIG. 2 is a diagram showing an external view of a portable game device used in the game system of FIG. 1.

As shown in FIG. 2, the portable game device 20 has a resin case 21, a liquid crystal display apparatus 22 provided on the top face of the case 21, and an input apparatus 23 provided below the liquid crystal display apparatus 22. A monochrome liquid crystal panel comprising 32×32 vertical and horizontal dots is for example used as the liquid crystal display apparatus 22. A switch 23a in a cross-like arrangement and push-button switches 23b, 23c, 23d and 23e for inputting in four directions (up, down, left and right) are for example provided as manipulation members to be manipulated by the player.

Figure 3:
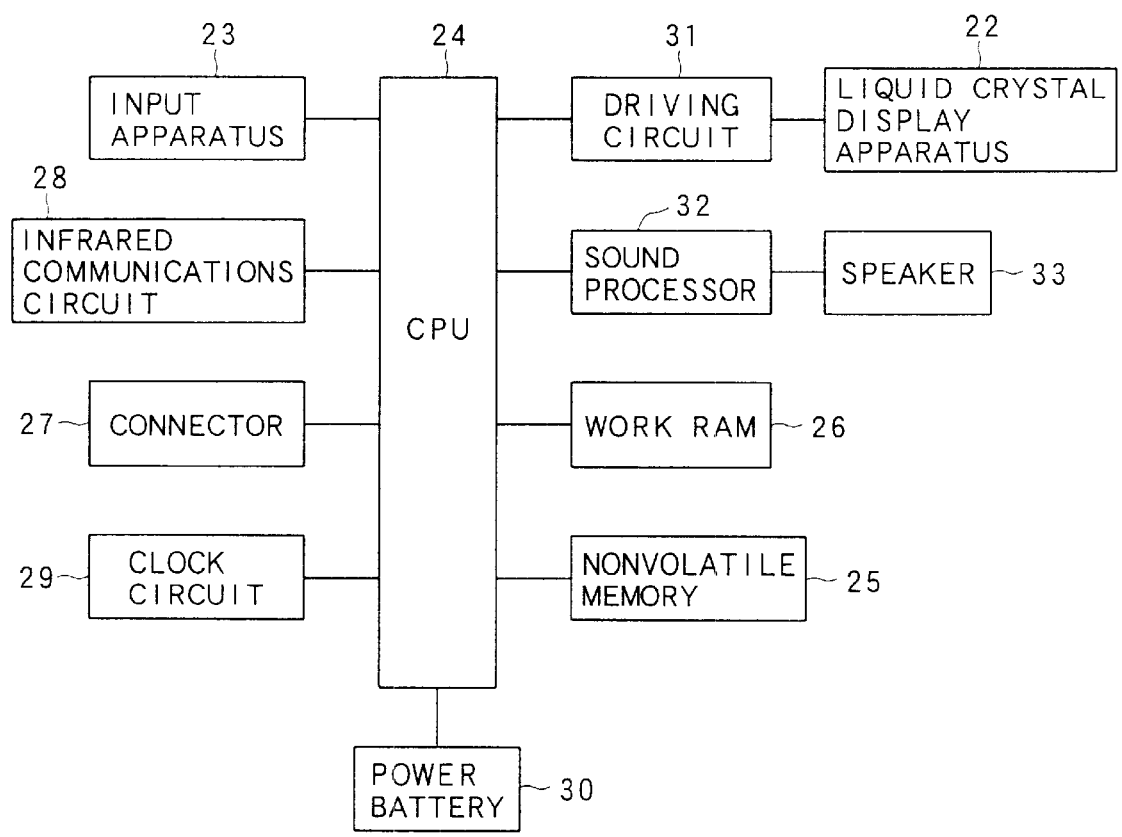
FIG. 3 is a block diagram of a control system of the portable game device of FIG. 2.

FIG. 3 shows the constitution of a control system of the portable game device 20. The portable game device 20 has a CPU 24 mainly comprising a microprocessor. The CPU 24 connects to an input apparatus 23, a nonvolatile memory 25, a work RAM 26, a connector 27, an infrared communications circuit 28, a clock circuit 29, and a power battery 30 which supplies a predetermined power for these elements. The liquid crystal display apparatus 22 is connected to the CPU 24 via a driving circuit 31, and a speaker 33 is connected to the CPU 24 via a sound processor 32. The nonvolatile memory 25 functions as a recording medium for storing data of the game executed by a CPU 1 of the game main body 16, and for example comprises an EEPROM. The work RAM 26 provides a work region for the CPU 24, and for example comprises a static random access memory (SRAM). The connector 27 electrically connects the portable game device 20 to the communication control device 11, and is for example provided on the side face of the case 21. The infrared communications circuit 28 communicates by infrared communications according to IrDA stipulations with the other devices which are capable of communication. A conventional audio processor such as a PCM sound source can be used as the sound processor 32.

Figure 4:
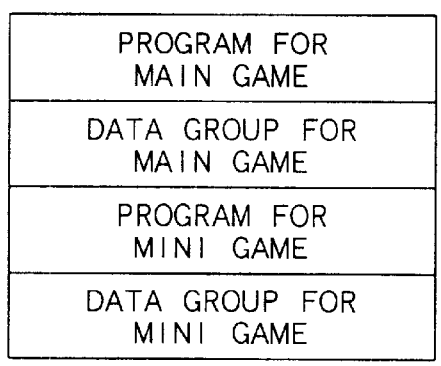
FIG. 4 is a diagram showing a program and data for game which are recorded in a CD-ROM in the game system of FIG. 1.

Programs and data which are needed for predetermined musical games executed by the game main body 16 and the portable game device 20 are stored in the CD-ROM 15 of FIG. 1. FIG. 4 shows one example of these programs and data. In this example, a program for main game executed by using the game main body 16, a data group used in the main game, a program for mini game executed by using the portable game device 20, and a data group used in the mini game are stored. When the CD-ROM 15 is set to the game main body 16, the CPU 1 executes a predetermined activation process in compliance with an operating system written in the ROM 2, and executes a control required to start the game in compliance with the program for main game of the CD-ROM 15. In brief, the main game which is executed in compliance with the program for main game comprises reproducing a predetermined BGM from the speaker 33 and specifying manipulations of the controller 12 to the player via the monitor 9 in a sequence corresponding to the BGM, and when the player manipulates the manipulation members on the controller 12 in response to the specified commands, sound effects corresponding to the player's manipulations are output from the speaker 33 and superimposed over the BGM, the manipulations being determined and displayed on the monitor 9.

A program for reading the above-described program for mini game and data group from the CD-ROM 15 and for down-loading them into the nonvolatile memory 25 of the portable game device 20 is stored in the CD-ROM 15. This program is for example called up from the program for main game and executed. The portable game device 20 performs the predetermined mini game by executing the down-loaded program by the CPU 24. The contents of the mini game will be explained later.

FIG. 5 shows a basic game screen which is displayed on the screen of the monitor 9 when the main game is being executed. A gauge 101 for specifying manipulation timings of the manipulation members on the controller 12 to the player is displayed approximately in the center of the game screen 100. In this embodiment, the game is configured on the assumption that it is played by using nine manipulation members in time to the music. For this reason, the gauge 101 is logically partitioned into nine vertically extending tracks 102a to 102i. Timing marks 103 . . . 103 are displayed to show manipulation timings of the manipulation buttons corresponding to each of the tracks 102a to 102i. The imaginary lines partitioning the tracks 102a to 102i of FIG. 5 are not displayed on the actual screen. In FIG. 5, vertical lines 104 . . . 104 are displayed, there being one vertical line for each of the tracks 102, but these are sometimes omitted.

When the game starts, the CPU 1 controls the timing marks 103 so that they gradually move downwards in the tracks 102a to 102i. When the timing marks 103 reach the bottoms of the tracks 102a to 102i, the manipulation timings of the manipulation members corresponding to the tracks 102a to 102i become active. When the player manipulates the corresponding manipulation members on the controller 12 in accordance with the manipulation timings, the CPU 1 determines the quality of the manipulations based on the deviation between the manipulation timings specified by the timing marks 103 and the timings of the manipulations actually carried out by the player, and displays the results in determination display sections 105 . . . 105 provided at the bottoms of the tracks 102a to 102i. Letters such as "COOL!", "YES!" and "WACK" are displayed in the determination display sections 105 in accordance with the determined results. The determined results may be displayed in the gauge 101 instead.

A score display section 106 displays the score of the game (1234 points in the example shown in FIG. 5) and is provided at the bottom left of the game screen 100. The score is obtained by calculating a value based on the determined results of each of the manipulation timings. A title display section 107 displays stage contents and the title of the BGM, and is provided at the bottom right of the game screen 100. Character display sections 108L and 108R are provided on each side of the gauge 101. The character display sections 108L and 108R display animations and the like of game characters. The displayed characters change in accordance with the BGM, and the contents of the animations change in accordance with the determined results of the manipulation timings, for example. A level gauge 110 is displayed below the determination display sections 105. The level gauge 110 visually displays an evaluation of the technique of the player by its length from its left end; the higher the evaluation, the greater the length of the level gauge 110.

Figure 6A:
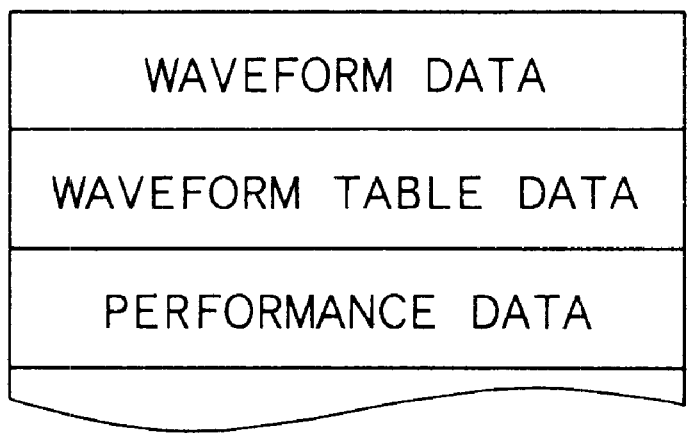
FIGS. 6A and 6B are diagrams showing the constitution of a musical piece X recorded in the CD-ROM of FIG. 1.
Figure 6B:
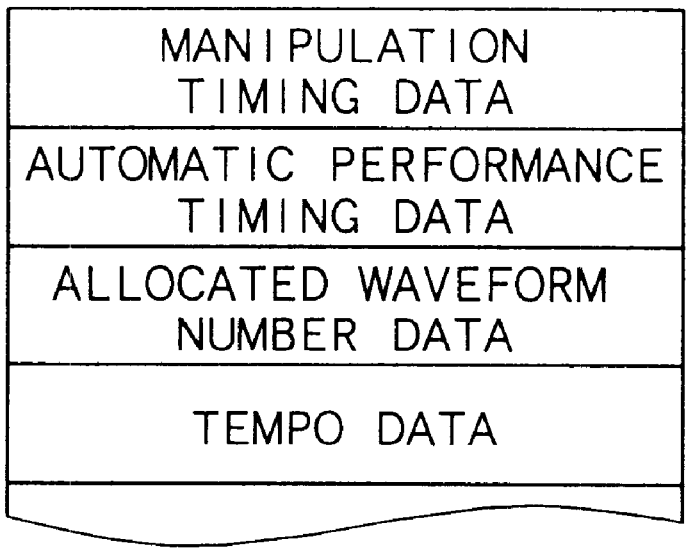

FIGS. 6A and 6B show constitutions of data from above mentioned data group for the main game which are provided in correspondence with BGM reproduction and display control of the gauge 101. In this game system, a plurality of tunes are prepared beforehand as BGM to be used in the game. The data shown in FIG. 6A is created for each tune and stored in the CD-ROM 15. The data of the tune X comprises waveform data, waveform table data and performance data. The waveform data comprises BGM data and sound effect data. The BGM data defines a waveform for reproducing the tune X, and the sound effect data defines sounds which are generated when the controller 12 is manipulated during the game. These data are created as for example PCM data and ADPCM data, and are stored in the CD-ROM 15. The sound effect data is included in the data of tune in order to generate sound effects which are appropriate to the BGM type. The waveform table data comprises information needed to extract the desired data for BGM and sound effect from the waveform data.

As shown in FIG. 6B, the performance data comprises manipulation timing data, automatic performance timing data, allocated waveform number data, and tempo data. The manipulation timing data specifies a relationship between the manipulation timings of the manipulation members corresponding to the tracks 102a to 102i and the time elapsed from the start of the performance of the tune X. In other words, the manipulation timing data specifies the times during the reproduction of the tune X at which the push-button switches and the like of the controller 12 ought to be manipulated in correspondence with the tracks 102a to 102i. The manipulation timing data forms the basis for determining the display of the gauge 101 and the manipulation of the controller 12.

Figure 7:
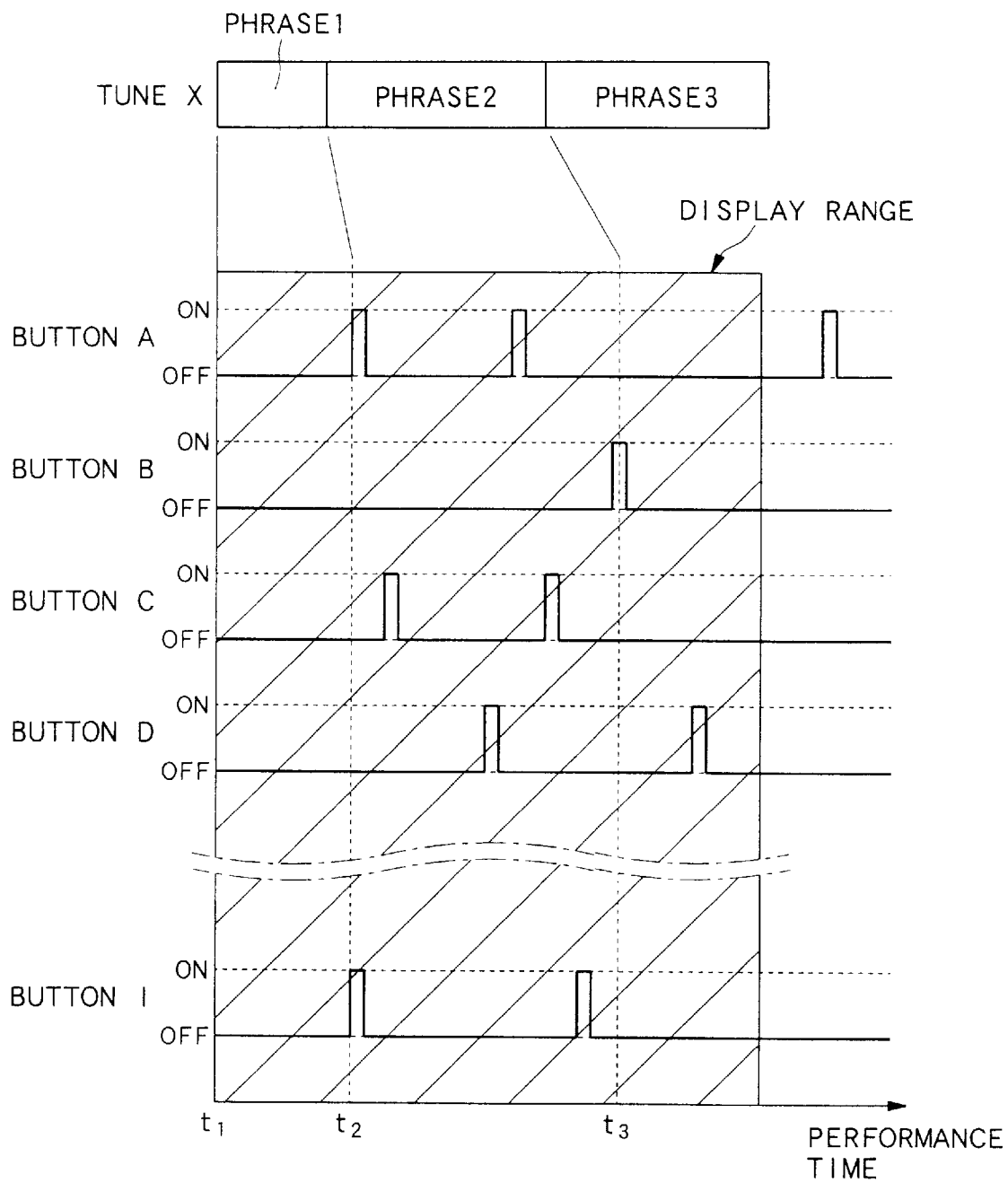

FIG. 7 shows one part of the manipulation timing data as time chart like for each of the manipulation buttons A to I. The ON positions in FIG. 7 correspond to the timings at which the manipulation buttons A to I are to be manipulated. In the manipulation timing data, the manipulation timings are identified by the time elapsed from the head of the tune X in compliance with a time axis (corresponding to the horizontal axis in FIG. 7) which takes the head of the BGM as its reference.

The tune X which is used as the BGM comprises a plurality of phrases, and the division times of each phrase t1, t2, t3 . . . are provided in correspondence with phrase numbers and stored in the manipulation timing data. The phrase numbers are serial numbers increasing sequentially as the phrases are performed in sequence, the phrase number of the first phrase being 1.

The automatic performance timing data of FIG. 6B is provided to generate sound effects even when the controller 12 has not been manipulated. That is, the automatic performance timing data identifies the timings for generating the sound effect when the manipulation buttons A to I are deemed to have been manipulated by the time elapsed from the head of the tune X. The automatic performance timing data is not essential for executing the game and can be omitted.

The allocated waveform number data specifies the relationship between the manipulations of the controller 12 and the sound effects. This relationship may be constant throughout the tune X, or varied at appropriate divisions (e.g. phrases of the tune X). The allocated waveform number data specifies the sound effects output when the controller 12 has been manipulated in compliance with the manipulation timings defined by the manipulation timing data and the automatic performance timing data. Thus, in this embodiment, the allocated waveform number data and the sound effect data specified by the allocated waveform number data function as data for reproducing the sound effects.

The relationship between the music which is reproduced in compliance with the BGM data and the sound effects specified by the allocated waveform number data may be such that when the main melody of the tune X in the BGM data is reproduced, the allocated waveform number data superimposes sound effects corresponding to the accompaniment of the main melody or an ad-lib performance thereover, or the other way around. The tempo data is data which indicates the performance tempo of tune X. In the case where the tempo changes during the tune X, the tempo is recorded in correspondence with the time from the start of the performance. In this game system, the display range of the gauge 101 is controlled after consulting the tempo data.

Figure 8:
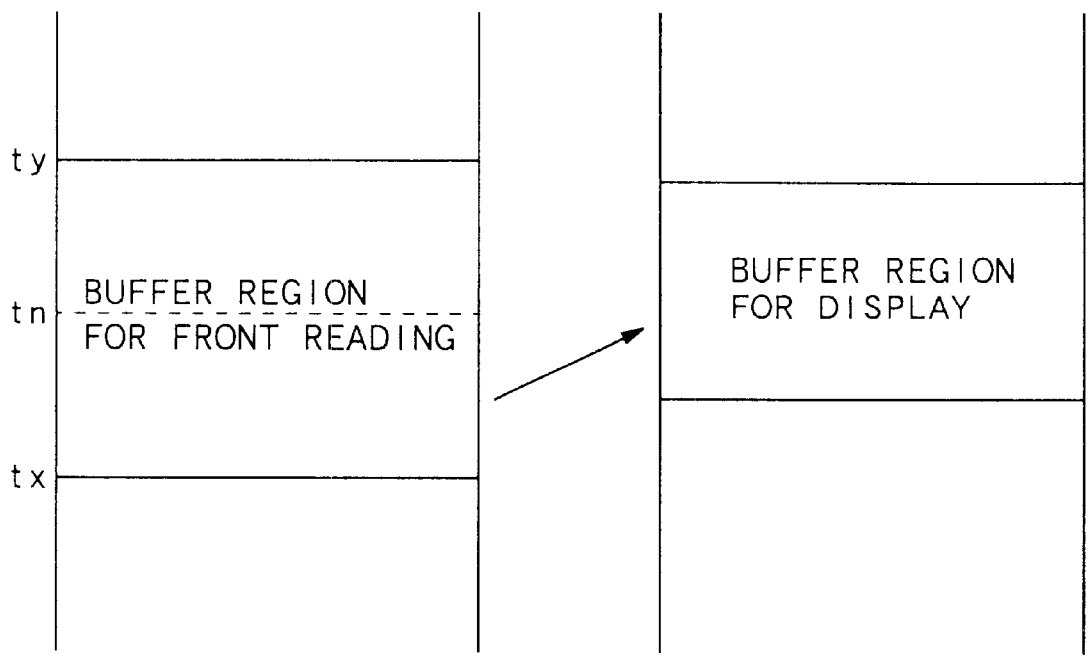
FIG. 8 is a diagram showing the state when the manipulation timing data of FIG. 6B is read to a memory.

FIG. 8 shows the relationship between the display range of the gauge 101 and the read range of the manipulation timing data during play. While the game is being played, a buffer region for front-reading the manipulation timing data is set in the RAM 3, and the manipulation timing data from the present time tx when the performance start point is used as a reference to a time ty is read into this region. From the data read to this front-read buffer region, the manipulation timing data from the present time tx to the time tn (<ty) are further read to a buffer region for display of the RAM 3. The period of time from the time tx to the time tn is set to be equivalent to two bars of the tune X, the temporal length of this period changing in accordance with the performance tempo of the tune X. Therefore, the CPU 1 consults the tempo data to determine the time tn which is two bars later than the present time tx, and reads the manipulation timing data between the time tx and the time tn to the buffer region for display as the display range of the gauge 101. The CPU 1 calculates the arrangement of the timing marks 103 in the gauge 101 in compliance with the manipulation timing data which has been read to the buffer region for display, and creates image data for displaying the gauge 101 based on the calculated result. The GPU 4 updates the game screen 100 based on the image data, whereby a gauge 101 appropriate for the present time tx is displayed in the game screen 100. The time ty in the front-read region may also be changed in accordance with the tempo of the tune X. The amount of data read to the buffer region for display is not limited to two bars, and may be varied.

Figure 9:
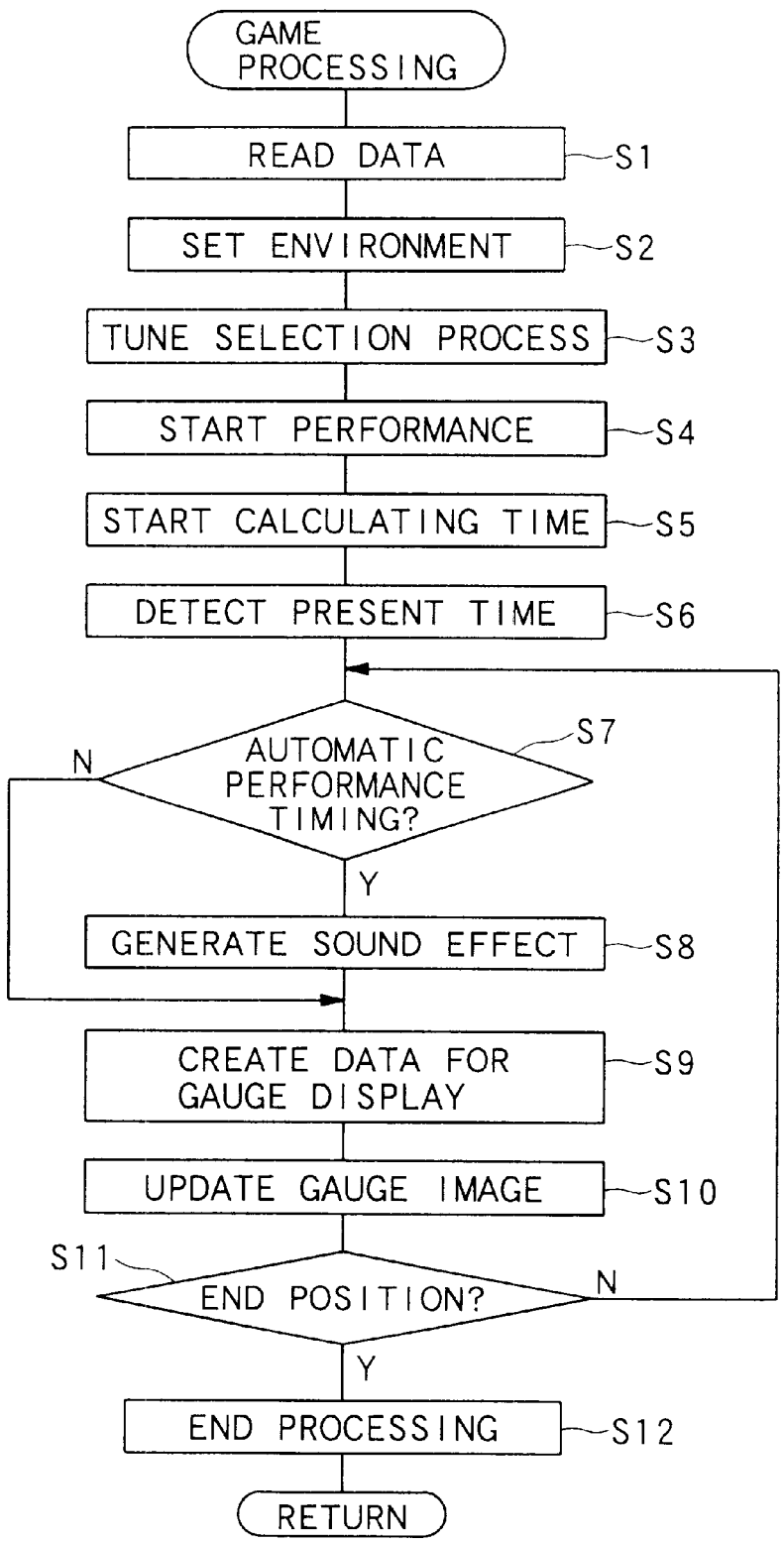
FIG. 9 is a flowchart showing a sequence of main game process which is executed by a CPU of the main body of the game device of FIG. 1.

FIG. 9 is a flowchart showing a sequence of game processes executed by the CPU 1 in compliance with the program for main game. In this processing, the data needed to start the game is read from the CD-ROM 15 (Step S1), and an environment needed to execute the game is set (Step S2). In Step S3, a predetermined tune selection process is carried out. The tune selection comprises displaying the selectable tunes to the player and allowing him or her to select one tune to be played therefrom. The range of selectable tunes varies in accordance with the progress of the game. For example, only easy tunes may be selectable at first, and more difficult tunes gradually introduced for selection when the easy tunes have been cleared. Some tunes are set as hidden elements which cannot be selected unless fixed conditions have been satisfied. The conditions for introducing a tune set as a hidden element relate to the game score, the number of plays, etc.

When the tune selection ends, the CD-ROM reading apparatus 8 is commanded to start performing (reproducing) the selected tune (Step S4), and calculation of the time elapsed since the start of the performance starts (Step S5). The present time is detected in the subsequent step S6, and it is determined whether the detected time corresponds to the automatic performance timing of any of the manipulation buttons A to I (Step S7). If the detected time is an automatic performance timing, the sound effect corresponding to the appropriate manipulation button A to I is generated (Step S8).

Data for displaying the gauge 101 in correspondence with the present time on the monitor 9 (e.g. coordinates of the timing marks 103) is created based on the manipulation timing data (Step S9), and the display of the gauge 101 is updated based on that data (Step S10). After the display of the gauge 101 has been updated, it is determined whether play has reached the end position of the BGM performance (Step S11). When the play has not reached the end position, the processing returns to the step S7. When the play has reached the end position, a predetermined end process is carried out (Step S12), and the processing of the one tune ends.

Figure 10:
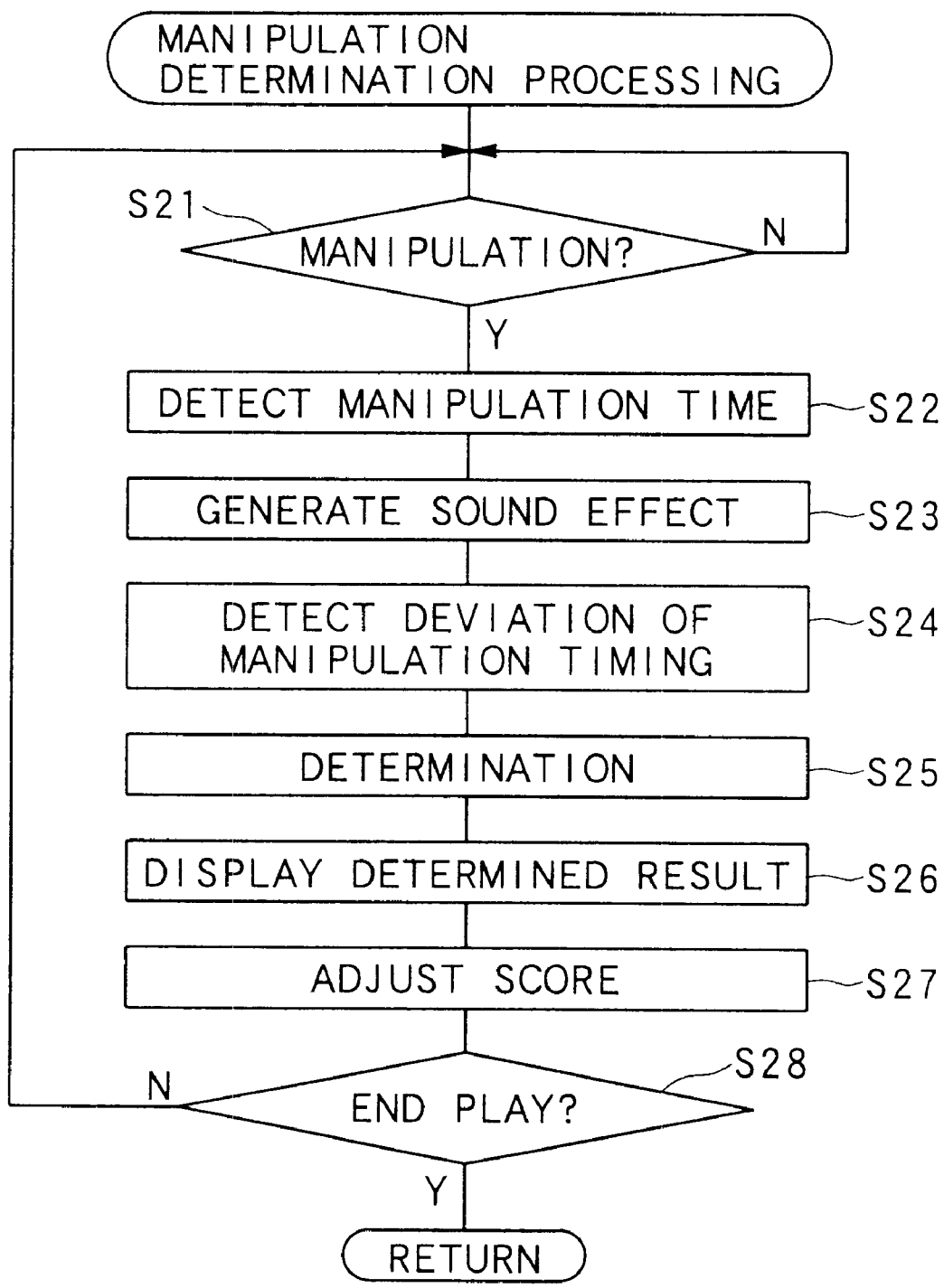
FIG. 10 is a flowchart showing a sequence of manipulation determining processes executed in series by the CPU while BGM is being reproduced by the processing of FIG. 9.

FIG. 10 is a flowchart showing a sequence of processes for determining manipulation, which are executed in series by the CPU 1 while the processes between steps S7 to S11 of FIG. 9 are being repeated. In this processing, it is firstly determined whether the player has manipulated the manipulation members of the controller 12 corresponding to any of the manipulation buttons A to I (Step S21). When the result of this determination is affirmative, the time of the manipulation is detected (Step S22). The sound effects allocated to the manipulation buttons A to I which have been manipulated is output from the speaker 10 (Step S23).

In the subsequent step S24, the temporal deviation between the manipulation time which was detected in Step S2 and the manipulation timing which is nearest to the present time among those specified in the manipulation timing data (but limited to the manipulation timings for the manipulation buttons which have actually been pressed) is detected. The quality of the manipulation divided into several stages is determined based on the detected deviation (Step S25). In a subsequent step S26, the track 102 corresponding to the button to which the manipulation on the game screen 100 has been carried out, and the word and the like corresponding to the determined result of the determination display section 105 are displayed (see FIG. 5).

In a subsequent step S27, the score from the start of the performance to the present is calculated in compliance with the result determined in Step S25. For example, a standard position is provided for the determined result and when points are added thereto when a better result is determined, and points are deducted therefrom when a worse result is determined, and the like, so that the score increases in proportion to the excellence of the individual manipulations. The length of the level gauge 110 is also adjusted in accordance with the determined result. It is determined in Step S28 whether play has ended. When it is determined that play has not yet ended, the processing returns to step S21. When it is determined that play has ended, the manipulation determination processing ends.

When a predetermined condition (e.g. a predetermined remaining amount of the level gauge 110) has been satisfied at the end of one tune game, that tune is cleared and the player is allowed to proceed to the next stage of the game. By repeating this type of processing, the progression of the game increases and the player can play tunes of various genres.

When the player has executed the main game, information relating to the status of the execution of the game is stored in the RAM 3 of the game main body 16. This information comprises information relating to the progression of the game such as play history information for judging whether the player has played every tune, whether each individual tune has been cleared and the like, and the number of plays and the like. When the player carries out a predetermined save manipulation using the controller 12 while the program for main game is being executed, the information representing the status of the game stored in the RAM 3 at that point is written to a predetermined block in the nonvolatile memory 25 of the portable game device 20 as a user data file (see FIG. 11). The user data file includes the play history information.

Subsequently, the mini game executed by the portable game device 20 will be explained with reference to FIG. 12 and FIG. 13. The data group for mini game shown in FIG. 4 comprises basically the same data as shown in FIGS. 6A and 6B. The tunes stored in the data group for mini game match the tunes stored in the data group for main game. That is, the same tunes can be played with the game main body 16 and with the portable game device 20. Nevertheless, the contents of the waveform data, waveform table data and performance data for the same tune differ due to the differences between the constitution of the game main body 16 and the constitution of the portable game device 20. For example, since the input apparatus 23 of the portable game device 20 has fewer manipulation members than the controller 12, the number of manipulation members stipulated in the performance data is reduced to five and the contents of the manipulation timing data consequently differs from that of the data for main game.

The sound effect data and BGM data included in the waveform data are adjusted in accordance with the differences in the performances of the SPU 6 of the game main body 16 and the sound processor 32 of the portable game device 20. As described above, in the game executed by the game main body 16, the main melody may be reproduced by the BGM data, or conversely, the allocated waveform number data and the sound effect data may be defined so that the main melody is reproduced when the player has manipulated the controller 12 in correspondence with a command displayed on the gauge 101. However, the sound processor 32 which can be installed in a portable game device 20 capable of being used portably has a lower performance (e.g. as regards the number of notes it can generate simultaneously, and the like) than the sound processor which can be installed in the game main body 16. For this reason, the sound processor 32 sometimes cannot carry out complex sound-generating processes. In this case, the allocated waveform number data and the sound effect should preferably be set so that the main melody of the tune is reproduced when the player correctly manipulates the input apparatus 23, the accompaniment and ad-lib performance data for the main melody being reproduced by using the BGM data. Although the accompaniment and ad-lib performance can be added and deleted in accordance with the performance of the sound processor 32, deleting the main melody makes it difficult for the player to recognize which tune is being performed. In view of this, it is more practical to reliably reproduce the main melody by using the sound effect data, and adjusting the BGM data within the range permitted by the capabilities of the CPU 24 and the sound processor 32.

Figure 12:
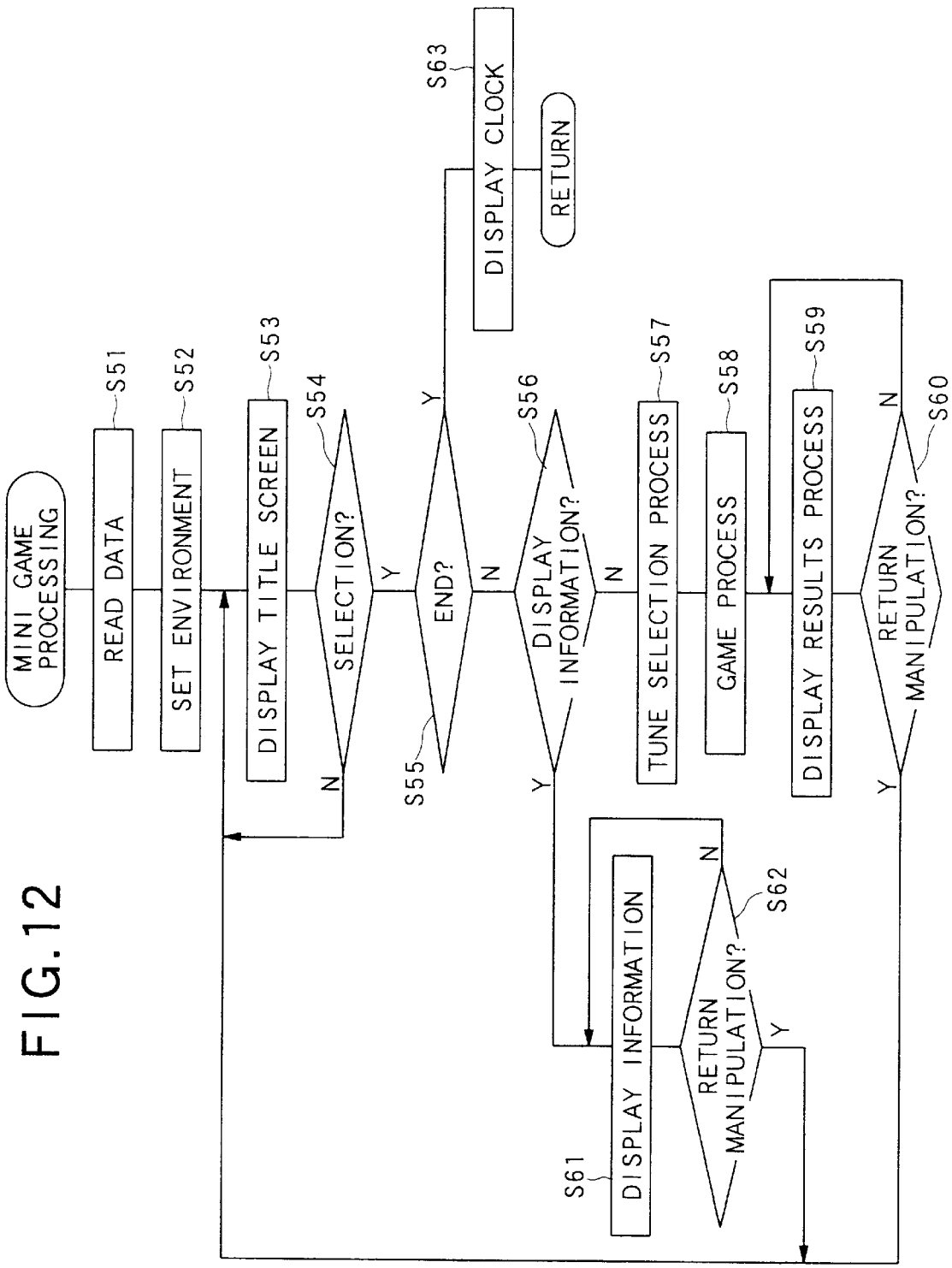
FIG. 12 is a flowchart showing a sequence of mini game processes executed by the CPU of the portable game device of FIG. 1.

FIG. 12 is a flowchart showing a sequence of mini game processes executed by the CPU 24 in compliance with the program for mini game. In this processing, the data needed to start the game is read from the nonvolatile memory 25 to the work RAM 26 (Step S51), and the environment needed to start the game is set based on the data which has been read (Step S52).

Thereafter, a predetermined title screen is provided on the liquid crystal display apparatus 22 (Step S53). The player can select "START MINI GAME", "DISPLAY INFORMATION" and "END MINI GAME" from the title screen.

It is determined whether the player has selected one of these items by manipulating the input apparatus 23 (Step S54), and if so, it is determined whether the player has selected "END MINI GAME" or "DISPLAY INFORMATION" (Steps S55 and S56). When neither of them has been selected, it is determined that "START MINI GAME" has been selected and a tune selection process is carried out (Step S57). As in Step S3 of FIG. 9, this tune selection process comprises displaying the selectable tunes to the player and allowing him or her to select one tune to be played therefrom. The range of selectable tunes at this point is determined based on the play history information in the user data file of the nonvolatile memory 25. For example, only tunes which have already been played by the player by using the game main body 16 are displayed as selectable tunes in the tune selection process.

When the tune selection ends, game processing is executed (Step S58). The game processing is carried out in compliance with a sequence identical to that shown in Steps S4 to S11 of FIG. 9 and the sequence shown in FIG. 10, but the finer details of the processing may be simplified in accordance with the capability of the portable game device 20. For example, the game screen displayed in the game processing may be simplified such as that shown in FIG. 13.

Figure 13:
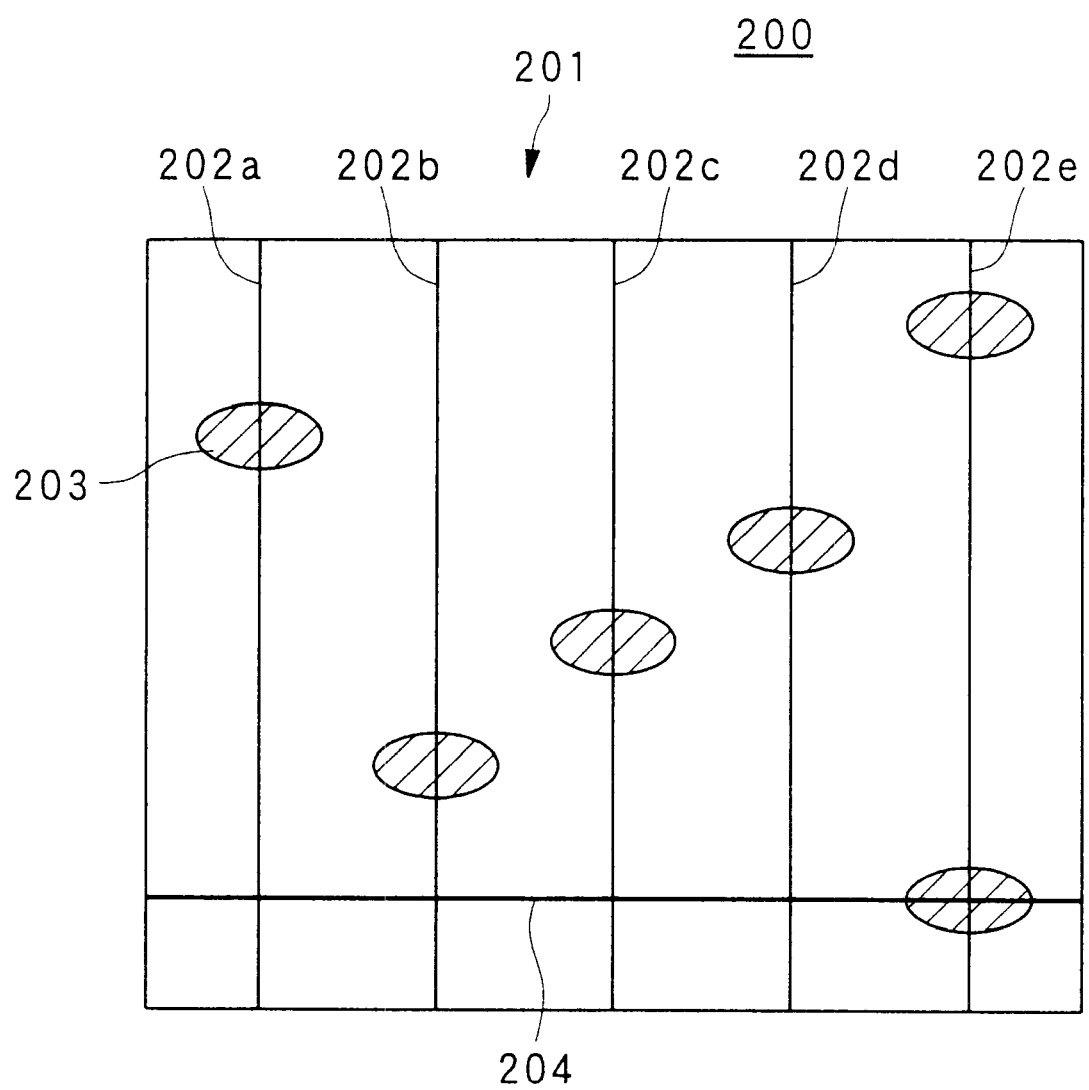
FIG. 13 is a diagram showing one example of a game screen displayed in the mini game executed by the CPU of the portable game device in compliance with the program for mini game of FIG. 4.

The game screen 200 of FIG. 13 displays only a gauge 201. The gauge 201 displays only five lines 202a to 202e corresponding to the manipulation members of the input apparatus 23, timing marks 203 corresponding to the lines 202a to 202e for displaying the manipulation timings of the manipulation members, and a timing line 204 for displaying the manipulation timings in conjunction with the timing marks 203. According to the process of step S58 of FIG. 12, the timing marks 203 move downward along the lines 202a to 202e as the music progresses, and the manipulation timings of the manipulation members corresponding to the lines 202a to 202e become active when the timing marks 203 have reached the timing line 204. When the player manipulates the manipulation members corresponding to the input apparatus 23 in time with the manipulation timings, the CPU 24 determines the quality of the player's manipulations based on the deviation between the manipulation timings specified by the timing marks 203 and the timings of the actual manipulations. The determined result is recorded in the work RAM 26.

Figure 14A:
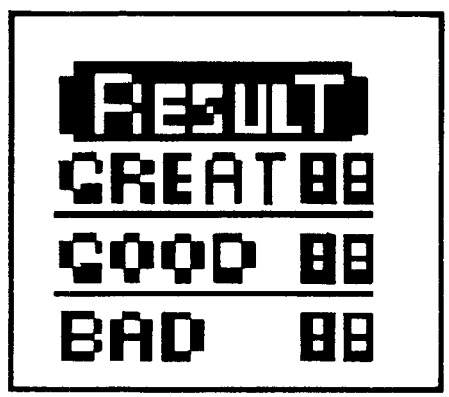
FIGS. 14A to 14D are diagrams showing other examples of a screen displayed during the mini game processing of FIG. 12.
Figure 14B:
Figure 14C:

After the game has ended, a process of displaying the game result is carried out based on the determined result which was recorded in the work RAM 26 (Step S59). For example, in the case where the manipulations of the manipulation members are divided into a plurality of levels and evaluated, the number of evaluations at each level is displayed as shown in FIG. 14A. A number of stages of comments may be prepared beforehand for each play as shown in FIGS. 14B and 14C, and displayed selectively in accordance with the overall game result. After the game result has been displayed, it is determined whether the player has manipulated the input apparatus 23 to carry out a predetermined return manipulation (Step S60). The game results are displayed continuously until the return manipulation is carried out, whereupon the processing returns to the step S53.

Figure 14D:
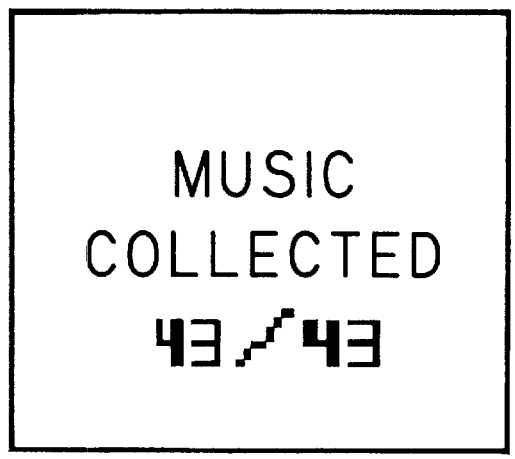

When it has been determined that the information display has been selected in Step S56, the information relating to the mini game is displayed (Step S61). The information displayed at this time includes the number of playable tunes in the mini game. For example, the total number of tunes and the number of playable tunes are displayed as shown in FIG. 14D. As mentioned above, since the tunes which are playable in the mini game are limited to those played in the main game executed in the game main body 16, the player can learn the number of unplayed tunes from this display. On the other hand, the number of selectable tunes varies according to the status of play in the main game. Therefore, to increase the number of tunes which are playable in the mini game, the player has to first play the main game and progress to a higher stage therein. This stimulates the player's desire to collect tunes and sufficiently retains his her interest in the main game.

After the information has been displayed, it is determined whether the player has carried out a predetermined return manipulation by using the input apparatus 23 (Step S62). The information is displayed continuously until such a return manipulation is carried out, whereupon the processing returns to the step S53. When it is determined in Step S55 that the player has selected to end the mini game, the time and date are displayed on the liquid crystal display apparatus 22 based on a signal supplied from a clock circuit 29 (see FIG. 3) (step S63), and the processing of the mini game ends.

In the embodiments described above, the tune selecting device, the manipulation guide device, the music reproducing device, the record executing device, the selection range setting device and the information display device are realised by combining the CPU 1 or the CPU 24, the peripheral devices and/or specific software. Alternatively, at least some of these units may be replaced by a logical circuit which uses LSI and the like.

The portable game device 20 may be provided on the controller 12. The controller 12 is not limited to a device manipulated by a player's fingers and may be manipulated by another part of his or her body, such as his or her feet. In the above-described embodiments, the game main body 16 and the portable game device 20 reproduce BGM and sound effects in correspondence with the manipulations of the input apparatus, but the portable game device 20 may for example reproduce only the sound effects. The game main body 16 and the portable game device 20 may each reproduce only BGM.

As described above, according to this invention, a game having an object of enjoying manipulating the first game device and the second game device in correspondence with music can be played. Furthermore, since the range of selectable tunes in the second game device changes in accordance with the progression of the game executed in the first game device, one of the pleasures of playing the game on the first game device is that the selectable tunes in the second game device change, thereby adding an element which cannot be realised by using a single game device. Consequently, the novelty of the game system is increased and the player's interest can be sufficiently maintained.

What is claimed is:

1. A game system comprising: first and second game devices, said second game device comprising memory device for save which allows said second game device to function as an auxiliary memory apparatus of said first game device, each of said first and second game devices comprising an input apparatus having a plurality of manipulation members which outputs a signal in accordance with manipulation of said manipulation members;

memory device for game in which there are stored for each of a plurality of tunes (a) data for music reproduction for reproducing said tunes and (b) timing data stipulating a series of manipulations of said input apparatus in correspondence with said plurality of tunes being stored in said memory device;

tune selecting device which selects one tune from said plurality of tunes;

manipulation guide device which specifies a series of manipulations of said input apparatus corresponding to said selected tune to a player based on timing data corresponding to the selected tune;

music reproducing device which reproduces said selected tune based on data for music reproduction corresponding to said selected tune;

said first game device comprising record executing device which stores information corresponding to the progression of the game executed in said first game device in said memory device for save of said second game device by using data stored in said memory device for game; and said second game device comprising selection range setting device which sets a range of selectable tunes in the tune selecting device of said second game device based on said information corresponding to the progression of the game stored in said memory device for save.

2. The game system according to claim 1, wherein said first game device comprises selection range setting device which sets a range of selectable tunes in said tune selecting device of said first game device based on the progression of the game in said first game device.

3. The game system according to claim 2, wherein the selection range setting device of said first game device enlarges the range of selectable tunes in said first game device in compliance with progression of said game, and the selection range setting device of said second game device enlarges the range of selectable tunes in said tune selecting device of said second game device in compliance with an increasing progression which is identified from the information provided in correspondence with the progression of said game stored in said memory device for save.

4. The game system according to claim 1 or 2, wherein said record executing device of said first game device stores information for determining whether each of said plurality of tunes has been selected in the game executed in said first game device as information provided in correspondence with said progression in said memory device for save; and said selection range setting device of said second game device sets the range of selectable tunes based on the information provided in correspondence with said progression stored in said memory device for save so that tunes corresponding to the tunes which were selected in the game executed in said first game device are made selectable in said second game device.

5. The game system according to claim 1 or 2, wherein the plurality of tunes prepared for said second game device matchs at least some of the plurality of tunes prepared for said first game device;

said record executing device of said first game device stores information for determining whether each of said plurality of tunes has been selected in the game executed in said first game device as information provided in correspondence with said progression in said memory device for save; and said selection range setting device of said second game device sets the range of selectable tunes based on the information provided in correspondence with said progression stored in said memory device for save, so that tunes matching tunes which have been selected in the game executed in said first game device are made selectable in said second game device, and tunes matching unselected tunes become nonselectable.

6. The game system according to claim 5, wherein said second game device comprises information display device which displays information representing the number of tunes which have been selected in the game executed in said first game device on a screen of a display device provided in said second game device based on the information provided in correspondence with said progression stored in said memory device for save.

7. The game system according to claim 1, wherein the data for each music reproduction in the memory device for game of said first and second game devices includes data for generating sound effects which generates predetermined sound effect in compliance with a series of manipulations stipulated in said timing data; and when said player has manipulated said input apparatus in compliance with said series of manipulations specified by said manipulation guide device, the music reproducing devices of said first and second game devices generate sound effects based on said data for generating sound effects in correspondence with each manipulation.

8. The game system according to claim 7, wherein said data for generating sound effects stored in said memory device for game of said second game device is configured so that, when said player has correctly manipulated said input apparatus in correspondence with said series of manipulations specified by said manipulation guide device of said second game device, a main melody of said selected tune is reproduced from said music reproducing device.

9. The game system according to one of claims 1 to 3, 7 or 8, wherein said second game device comprises a built-in power battery, and is constituted as a portable game device which can be operated by power supplied from the power battery.

10. A computer-readable memory medium capable of use in a game system comprising first and second game devices, said second game device comprising memory device for save which allows said second game device to function as an auxiliary memory apparatus of said first game device, the memory medium storing a program for game for executing predetermined games provided in correspondence with music in said first and second game devices by using computers of said first and second game devices, and a data group for game which is needed to execute the program for game;

said data group for game comprising (a) data for music reproduction for reproducing a plurality of tunes and (b) timing data for each tune stipulating a series of manipulations of said input apparatus in correspondence with each of said plurality of tunes;

said program for game allowing the computers of said first and second game devices to function as tune selecting device which selects one tune from said plurality of tunes;

manipulation guide device which specifies a series of manipulation of said input apparatus corresponding to said selected tune to a player based on timing data corresponding to the selected tune;

music reproducing device which reproduces said selected tune based on data for music reproduction corresponding to said selected tune; and allowing the computer of said first game device to function as record executing device which stores information corresponding to the progression of the game executed in said first game device in said memory device for save of said second game device, and allowing the computer of said second game device to function as selection range setting device which sets a range of selectable tunes when the computer of the second game device functions as a tune selecting device based on said information corresponding to the progression of the game stored in said memory device for save.

* * * * *